(12) United States Patent
Coulson

(10) Patent No.: US 8,163,356 B2
(45) Date of Patent: Apr. 24, 2012

(54) PRODUCTS

(75) Inventor: Stephen Coulson, Abingdon (GB)

(73) Assignee: P2i Ltd (GB)

( * ) Notice: Subject to any disclaimer, the term of this patent is extended or adjusted under 35 U.S.C. 154(b) by 881 days.

(21) Appl. No.: 12/161,210

(22) PCT Filed: Jan. 19, 2007

(86) PCT No.: PCT/GB2007/000148
§ 371 (c)(1),
(2), (4) Date: Aug. 28, 2008

(87) PCT Pub. No.: WO2007/083121
PCT Pub. Date: Jul. 26, 2007

(65) Prior Publication Data
US 2010/0234524 A1 Sep. 16, 2010

Related U.S. Application Data

(60) Provisional application No. 60/762,249, filed on Jan. 26, 2006.

(30) Foreign Application Priority Data

Jan. 20, 2006 (GB) .................................. 0601113.4

(51) Int. Cl.
*B05D 3/04* (2006.01)
(52) U.S. Cl. ........ 427/532; 427/533; 427/535; 427/569; 427/570
(58) Field of Classification Search .................. 252/500; 427/532, 533, 535, 569, 570
See application file for complete search history.

(56) References Cited

U.S. PATENT DOCUMENTS

| | | | |
|---|---|---|---|
| 4,649,071 A | 3/1987 | Tajima et al. | |
| 5,041,304 A | 8/1991 | Kusano et al. | |
| 6,129,956 A | * 10/2000 | Morra et al. | ........... 427/535 |

FOREIGN PATENT DOCUMENTS

| | | |
|---|---|---|
| EP | 0896035 A2 | 2/1999 |
| EP | 1557489 A1 | 7/2005 |
| WO | WO-98/58117 A1 | 12/1998 |
| WO | WO 9858117 A1 * | 12/1998 |
| WO | WO-02/28548 A2 | 4/2002 |
| WO | WO-03/063938 A1 | 8/2003 |
| WO | WO-03/097245 A2 | 11/2003 |
| WO | WO-03/101621 A2 | 12/2003 |
| WO | WO-2005/089961 A1 | 9/2005 |

* cited by examiner

*Primary Examiner* — Eisa Elhilo
(74) *Attorney, Agent, or Firm* — Connolly Bove Lodge & Hutz LLP

(57) ABSTRACT

A laboratory consumable having a polymeric coating, coating formed by exposing said consumable to pulsed plasma for a sufficient period of time to allow a polymeric layer to form on the surface of the laboratory consumable, said plasma comprising a compound of formula (I)

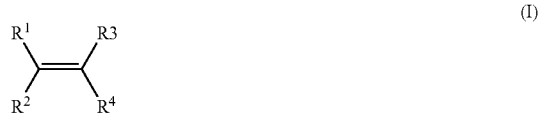

(I)

where $R^1$, $R^2$, $R^3$ and $R^4$ are as defined in the specification. Consumables of this type show significantly reduced liquid sample retention, maximum sample recovery and ultra non-binding properties, as well as oil and water-repellency.

24 Claims, No Drawings

PRODUCTS

RELATED APPLICATIONS

This application is a national stage application under 35 U.S.C. §371 of PCT/GB2007/000148, filed Jan. 19, 2007, which claims priority of United Kingdom application 0601113.4, filed Jan. 20, 2006; and U.S. provisional application 60/762,249, filed Jan. 26, 2006.

The present invention relates to novel products in the form of laboratory consumables, which are treated to prevent retention of reagents on the surface thereof, as well as to processes for their production.

There is a need for laboratory equipment and in particular laboratory consumables, to be as non-binding to reagents or samples as possible so as to avoid retention of these on the equipment. In particular, the biochemical and chemical reactions conducted for example for research or analysis, and in particular medical or forensic diagnostics, often use very small volumes of samples or reagents. Retention of samples or reagents in any significant proportion on the surface of laboratory equipment, which comes into direct contact with them during the sample or reagent handling can affect the results significantly. Furthermore, since many of the reagents are extremely costly, there are economic implications as a result of reagent loss in this way.

Various approaches have been made to address this problem. These include processes aimed at creating ultra smooth surfaces or solid materials such as those used to produce pipette tips in order to reduce retention. Other approaches have included processes aimed at adding additives to migrate through the polymer dip coating the tips in a liquid repellent media.

Plasma deposition techniques have been quite widely used for the deposition of polymeric coatings onto a range of surfaces, and in particular onto fabric surfaces. This technique is recognised as being a clean, dry technique that generates little waste compared to conventional wet chemical methods. Using this method, plasmas are generated from organic molecules, which are subjected to an electrical field. When this is done in the presence of a substrate, the radicals of the compound in the plasma polymerise on the substrate. Conventional polymer synthesis tends to produce structures containing repeat units that bear a strong resemblance to the monomer species, whereas a polymer network generated using a plasma can be extremely complex. The properties of the resultant coating can depend upon the nature of the substrate as well as the nature of the monomer used and conditions under which it is deposited.

The applicants have found that by utilising a specific type of monomer under particular deposition conditions, laboratory consumables having ultra-non-binding nano-coatings thereon can be produced.

According to the present invention there is provided a laboratory consumable having a polymeric coating, formed by exposing said consumable to pulsed plasma comprising a compound of formula (I)

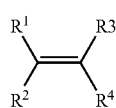

(I)

where $R^1$, $R^2$ and $R^3$ are independently selected from hydrogen, alkyl, haloalkyl or aryl optionally substituted by halo; and $R^4$ is a group X—$R^5$ where $R^5$ is an alkyl or haloalkyl group and X is a bond; a group of formula —C(O)O(CH$_2$)$_n$Y— where n is an integer of from 1 to 10 and Y is a bond or a sulphonamide group; or a group —(O)$_p$R$^6$(O)$_q$(CH$_2$)$_t$— where $R^6$ is aryl optionally substituted by halo, p is 0 or 1, q is 0 or 1 and t is 0 or an integer of from 1 to 10, provided that where q is 1, t is other than 0, for a sufficient period of time to allow a polymeric layer to form on the surface of the laboratory consumable.

The polymeric layer enhances the surface of the laboratory consumable in particular by making it more oil and water repellent, and, in some cases, making it an ultra-non-binding surface.

As used herein, the expression "in a gaseous state" refers to gases or vapours, either alone or in mixture, as well as aerosols.

As used herein, the term "laboratory consumable" refers to any piece of equipment, which comes into contact with liquid reagents, polar and apolar solvents or samples in the course of normal laboratory use, including use for example in medical environments such as hospitals and research laboratories. Generally these will be single use disposable devices, although some may be used repeatedly, for example after washing or cleaning of some type.

Particular examples of laboratory consumables include pipette tips, filtration membranes, microplates (including 96 well plates), immunoassay products (such as lateral flow devices), centrifuge tubes (including microcentrifuge tubes), microtubes, specimen tubes, test tubes, blood collection tubes, flat based tubes, aseptically produced containers, general labware, burettes, curvettes, needles, hypodermic syringes, sample vials/bottles, screw cap containers, or weighing bottles. These can be made from a wide variety of materials such as, thermosetting resins, thermoplastic resins polyolefins, acetals, polyamidic resins, acrylic resins (PMMA), hydrocarbons or fluorocarbons such as polyethylene (PE), polypropylene (PP), polymethylpentene (PMP or TPX®), polystyrene (PS), polyvinyl chloride (PVC), polyoxymethylene (POM), nylon (PA6), polycarbonates (PC), polytetrafluoroethylene (PTFE), tetrafluoroethylene-perfluoropropylene (FEP), perfluoroalkoxy (PFA), polyvinylidene fluoride (PVDF), ethylene-tetrafluorethylene (ETFE), ethylene-cholortrifluoroethylene (E-CTFE) and glass.

In a particular embodiment, the laboratory consumable is a pipette tip. By utilising the method defined above, highly advantageous pipette tips have been produced. In particular, the main features and benefits of using this approach are that both the inside and the outside of the tip are coated and so enhanced, allowing much less binding to all surfaces, reducing loss of liquid and maximizing sample recovery.

Laboratory consumables treated in this way provide are water and oil repellent, and also resistant to clogging. They may have useful "shake dry" properties also, reducing risk of contamination after washing.

Furthermore, the enhancement material or layer is molecularly bound to the surface and so there are no leachables; the modification becomes part of the device. The coated tips' surface displays much lower surface energies then polypropylene and so will bind less material. As a result, liquid retention by the pipette tip in use is virtually eliminated (as can be illustrated photographically) meaning that the results obtained using these tips are more accurate and reliable, and reagent costs can be reduced, in some cases by more than 10%.

Similar advantages accrue in relation to other laboratory consumables which are used to handle in particular small volumes of sample or reagent, such as microtitre plates. microplates (including 96 well plates), centrifuge tubes (including microcentrifuge tubes) and microtubes.

The fact that needles and syringes can be made so that virtually no liquid is retained therein is a significant advantage since it means that accurate dosing of materials, in particular medicines and the like, can be ensured.

Another type of laboratory consumable to benefit significantly from the modification of the invention are membranes such as those used as filtration membranes or those used in immunoassay devices. These membranes are made of porous material. It is necessary for liquid to pass through the pores of the material. In the case of filtration membranes, particles above a particular size are retained on the surface. In the case of membranes used immunoassays, liquid and small particles such as gold or latex particles are required also to pass through the pores of the membrane. Although these membranes are able to fulfil these functions, they are generally made of a liquid absorbent material such as cellulose. This means that significant quantities of liquid will be retained within the membrane, as they will become saturated in use. This can be problematic, in particular where only small volumes of liquid are being used.

Membranes treated in accordance with the invention retain their porosity, as the coating layer deposited thereon is only molecules thick. Therefore, the liquid or even small particles can continue to pass through them, in particular when a positive pressure is applied to the liquid, or a negative pressure is applied to the other side of the membrane to draw the liquid through. However, larger particles will not. However, substantially all the liquid applied will pass through the membrane, since it will not adhere or be absorbed by the material of the membrane.

Precise conditions under which the plasma polymerization takes place in an effective manner will vary depending upon factors such as the nature of the polymer, the laboratory consumable etc. and will be determined using routine methods and/or the techniques.

Suitable plasmas for use in the method of the invention include non-equilibrium plasmas such as those generated by radiofrequencies (Rf), microwaves or direct current (DC). They may operate at atmospheric or sub-atmospheric pressures as are known in the art. In particular however, they are generated by radiofrequencies (Rf).

Various forms of equipment may be used to generate gaseous plasmas. Generally these comprise containers or plasma chambers in which plasmas may be generated. Particular examples of such equipment are described for instance in WO2005/089961 and WO02/28548, the content of which are incorporated herein by reference, but many other conventional plasma generating apparatus are available.

In general, the item to be treated is placed within a plasma chamber together with the material to be deposited in gaseous state, a glow discharge is ignited within the chamber and a suitable voltage is applied, which may be pulsed.

The gas used within the plasma may comprise a vapour of the monomeric compound alone, but it may be combined with a carrier gas, in particular, an inert gas such as helium or argon. In particular helium is a preferred carrier gas as this can minimises fragmentation of the monomer.

When used as a mixture, the relative amounts of the monomer vapour to carrier gas is suitably determined in accordance with procedures which are conventional in the art. The amount of monomer added will depend to some extent on the nature of the particular monomer being used, the nature of the laboratory disposable being treated, the size of the plasma chamber etc. Generally, in the case of conventional chambers, monomer is delivered in an amount of from 50-250 mg/min, for example at a rate of from 100-150 mg/min. Carrier gas such as helium is suitably administered at a constant rate for example at a rate of from 5-90, for example from 15-30 sccm. In some instances, the ratio of monomer to carrier gas will be in the range of from 100:1 to 1:100, for instance in the range of from 10:1 to 1:100, and in particular about 1:1 to 1:10. The precise ratio selected will be so as to ensure that the flow rate required by the process is achieved.

Alternatively, the monomer may be delivered into the chamber by way of an aerosol device such as a nebuliser or the like, as described for example in WO2003/097245 and WO03/101621, the content of which is incorporated herein by reference.

In some cases, a preliminary continuous power plasma may be struck for example for from 2-10 minutes for instance for about 4 minutes, within the chamber. This may act as a surface pre-treatment step, ensuring that the monomer attaches itself readily to the surface, so that as polymerisation occurs, the coating "grows" on the surface. The pre-treatment step may be conducted before monomer is introduced into the chamber, in the presence of only the inert gas.

The plasma is then suitably switched to a pulsed plasma to allow polymerisation to proceed, at least when the monomer is present.

In all cases, a glow discharge is suitably ignited by applying a high frequency voltage, for example at 13.56 MHz. This is suitably applied using electrodes, which may be internal or external to the chamber, but in the case of the larger chambers are internal.

Suitably the gas, vapour, gas mixture or aerosol is supplied at a rate of at least 1 standard cubic centimetre per minute (sccm) and preferably in the range of from 1 to 100 sccm.

In the case of the monomer vapour, this is suitably supplied at a rate of from 80-300 mg/minute, for example at about 120 mg per minute depending upon the nature of the monomer, whilst the pulsed voltage is applied.

Gases or vapours may be drawn or pumped into the plasma region. In particular, where a plasma chamber is used, gases or vapours may be drawn into the chamber as a result of a reduction in the pressure within the chamber, caused by use of an evacuating pump, or they may be pumped or injected into the chamber as is common in liquid handling.

Polymerisation is suitably effected using vapours of compounds of formula (I), which are maintained at pressures of from 0.1 to 200 mtorr, suitably at about 80-100 mtorr.

The applied fields are suitably of power of from 40 to 500 W, suitably at about 100 W peak power, applied as a pulsed field. The pulses are applied in a sequence which yields very low average powers, for example in a sequence in which the ratio of the time on:time off is in the range of from 1:500 to 1:1500. Particular examples of such sequence are sequences where power is on for 20-50 µs, for example about 30 µs, and off for from 1000 µs to 30000 µs, in particular about 20000 µs. Typical average powers obtained in this way are 0.01 W.

The fields are suitably applied from 30 seconds to 90 minutes, preferably from 5 to 60 minutes, depending upon the nature of the compound of formula (I) and the laboratory consumable etc.

Suitably a plasma chamber used is of sufficient volume to accommodate multiple laboratory consumables, for example up to 500,000 pipette tips at the same time.

A particularly suitable apparatus and method for producing laboratory consumables in accordance with the invention is described in WO2005/089961, the content of which is hereby incorporated by reference.

In particular, when using high volume chambers of this type, the plasma is created with a voltage as a pulsed field, at an average power of from 0.001 to 500 w/m$^3$, for example at from 0.001 to 100 w/m$^3$ and suitably at from 0.005 to 0.5 w/m$^3$.

These conditions are particularly suitable for depositing good quality uniform coatings, in large chambers, for example in chambers where the plasma zone has a volume of greater than 500 cm$^3$, for instance 0.5 m$^3$ or more, such as from 0.5 m$^3$-10 m$^3$ and suitably at about 1 m$^3$. The layers formed in this way have good mechanical strength.

The dimensions of the chamber will be selected so as to accommodate the particular laboratory consumable being treated. For instance, generally cuboid chambers may be suitable for a wide range of applications, but if necessary, elongate or rectangular chambers may be constructed or indeed cylindrical, or of any other suitable shape.

The chamber may be a sealable container, to allow for batch processes, or it may comprise inlets and outlets for laboratory consumables, to allow it to be utilised in a continuous process. In particular in the latter case, the pressure conditions necessary for creating a plasma discharge within the chamber are maintained using high volume pumps, as is conventional for example in a device with a "whistling leak". However it will also be possible to process certain items at atmospheric pressure, or close to, negating the need for "whistling leaks"

The monomers used are selected from monomers of formula (I) as defined above. Suitable haloalkyl groups for R$^1$, R$^2$, R$^3$ and R$^5$ are fluoroalkyl groups. The alkyl chains may be straight or branched and may include cyclic moieties.

For R$^5$, the alkyl chains suitably comprise 2 or more carbon atoms, suitably from 2-20 carbon atoms and preferably from 6 to 12 carbon atoms.

For R$^1$, R$^2$ and R$^3$, alkyl chains are generally preferred to have from 1 to 6 carbon atoms.

Preferably R$^5$ is a haloalkyl, and more preferably a perhaloalkyl group, particularly a perfluoroalkyl group of formula C$_m$F$_{2m+1}$ where m is an integer of 1 or more, suitably from 1-20, and preferably from 4-12 such as 4, 6 or 8.

Suitable alkyl groups for R$^1$, R$^2$ and R$^3$ have from 1 to 6 carbon atoms.

In one embodiment, at least one of R$^1$, R$^2$ and R$^3$ is hydrogen. In a particular embodiment R$^1$, R$^2$, R$^3$ are all hydrogen. In yet a further embodiment however R$^3$ is an alkyl group such as methyl or propyl.

Where X is a group —C(O)O(CH$_2$)$_n$Y—, n is an integer which provides a suitable spacer group. In particular, n is from 1 to 5, preferably about 2.

Suitable sulphonamide groups for Y include those of formula —N(R$^7$)SO$_2$— where R$^7$ is hydrogen or alkyl such as C$_{1-4}$alkyl, in particular methyl or ethyl.

In one embodiment, the compound of formula (I) is a compound of formula (II)

where R$^5$ is as defined above in relation to formula (I).

In compounds of formula (II), X in formula (I) is a bond.

However in a preferred embodiment, the compound of formula (I) is an acrylate of formula (III)

where n and R$^5$ as defined above in relation to formula (I) and R$^7$ is hydrogen, C$_{1-10}$alkyl, or C$_{1-10}$haloalkyl. In particular R$^7$ is hydrogen or C$_{1-6}$alkyl such as methyl. A particular example of a compound of formula (III) is a compound of formula (IV)

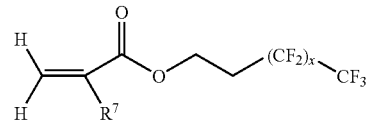

where R$^7$ is as defined above, and in particular is hydrogen and x is an integer of from 1 to 9, for instance from 4 to 9, and preferably 7. In that case, the compound of formula (IV) is 1H,1H,2H,2H-heptadecafluorodecylacylate.

In a further aspect, the invention provides a method for reducing liquid sample retention by a laboratory consumable, said method comprising exposing said consumable to a pulsed plasma comprising a compound of formula (I)

where R$^1$, R$^2$ and R$^3$ are independently selected from hydrogen, alkyl, haloalkyl or aryl optionally substituted by halo; and R$^4$ is a group X—R$^5$ where R$^5$ is an alkyl or haloalkyl group and X is a bond; a group of formula —C(O)O(CH$_2$)$_n$Y— where n is an integer of from 1 to 10 and Y is a bond or a sulphonamide group; or a group —(O)$_p$R$^6$(O)$_q$(CH$_2$)$_t$— where R$^6$ is aryl optionally substituted by halo, p is 0 or 1, q is 0 or 1 and t is 0 or an integer of from 1 to 10, provided that where q is 1, t is other than 0, in a gaseous state for a sufficient period of time to allow a polymeric layer to form on the surface of the laboratory consumable.

Suitably, the laboratory consumable is placed in a plasma deposition chamber, a glow discharge is ignited within said chamber, and a voltage applied as a pulsed field.

Suitable monomers and reaction conditions for use in this method are as described above.

The invention will now be particularly described by way of example.

EXAMPLE 1

Pipette Tips

A set of polypropylene pipette tips were placed into a plasma chamber with a processing volume of ~300 litres. The chamber was connected to supplies of the required gases or vapours, via a mass flow controller and/or liquid mass flow meter and a mixing injector as appropriate.

The chamber was evacuated to between 3-10 mtorr base pressure before allowing helium into the chamber at 20 sccm until a pressure of 80 mtorr was reached. A continuous power plasma was then struck for 4 minutes using RF at 13.56 MHz at 300 W.

After this period, 1H,1H,2H,2H-heptadecafluorodecylacylate (CAS #27905-45-9) of formula

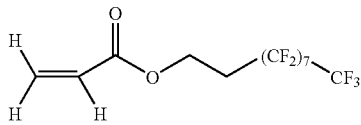

was brought into the chamber at a rate of 120 milli grams per minute and the plasma switched to a pulsed plasma at 30 micro seconds on-time and 20 milli seconds off-time at a peak power of 100 W for 40 minutes. On completion of the 40 minutes the plasma power was turned off along with the processing gases and vapours and the chamber evacuated back down to base pressure. The chamber was then vented to atmospheric pressure and the pipette tips removed.

It was found that the pipette tips was covered with an ultra-non-binding, pin-hole free modification that had a surface energy much lower that a Teflon® (PTFE) coated surface. The coating was distributed both inside and outside the pipette tip and was molecularly attached.

The performance of the pipette tips was significantly enhanced, as liquid retention was virtually eliminated and maximum sample recovery was possible.

EXAMPLE 2

Filter Paper

By using the same method as outlined in Example 1, cellulose filter papers (Whatman number 1) were placed into the chamber and processed under the same conditions. It was found that despite the fact the plasma enhanced paper appears the same, had the same handle and could not be differentiated either by appearance or feel; repelled water to an extent that the water formed beads on the surface which roll around effortlessly. Despite this, the droplets could be forced through the microporous paper if sufficient force was applied as the process does not block up the pores. The paper remained un-wet but can still carry out its filtering capabilities.

The invention claimed is:

1. A laboratory consumable comprising a polymeric coating, wherein the polymeric coating is formed by exposing the consumable to a pulsed plasma for a period of time sufficient to form a polymeric layer on a surface of the laboratory consumable, the plasma comprising a compound of formula (I)

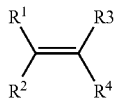
(I)

where $R^1$, $R^2$ and $R^3$ are selected independently from hydrogen, alkyl, haloalkyl or aryl optionally substituted by halogen; and $R^4$ is a group $XR^5$ where $R^5$ is an alkyl or haloalkyl group and X is a bond; or $R^4$ is $C(O)O(CH_2)_nY$ where n is an integer of 1 to 10 and Y is a bond, an alkyl or haloalkyl group, or a sulphonamide group; or $R^4$ is $(O)_pR^6(O)_q(CH_2)_t$ where $R^6$ is aryl optionally substituted by halogen, p is 0 or 1, q is 0 or 1 and t is 0 or an integer of 1 to 10, provided that where q is 1, t is other than 0.

2. The laboratory consumable of claim 1 selected from the group consisting of pipette tips, filtration membranes, microplates, immunoassay products, centrifuge tubes, microtubes, specimen tubes, test tubes, blood collection tubes, flat based tubes, aseptically produced containers, general labware, burettes, cuvettes, needles, hypodermic syringes, sample vials/bottles, screw cap containers, and weighing bottles.

3. The laboratory consumable of claim 1, which is a pipette tip.

4. The laboratory consumable of claim 1, wherein the exposing to the pulsed plasma takes place within a plasma deposition chamber.

5. The laboratory consumable of claim 1, wherein the compound of formula (I) is a compound of formula (II)

$$CH_2=CH-R^5 \qquad (II)$$

where $R^5$ is an alkyl or haloalkyl group.

6. The laboratory consumable of claim 1, wherein the compound of formula (I) is a compound of formula (III)

$$CH_2=CR^7C(O)O(CH_2)_nR^5 \qquad (III)$$

where n is an integer of 1 to 10; $R^5$ is an alkyl or haloalkyl group; and $R^7$ is hydrogen, $C_{1-10}$ alkyl, or $C_{1-10}$haloalkyl.

7. The laboratory consumable of claim 6, wherein the compound of formula (III) is a compound of formula (IV)

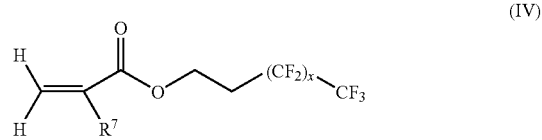
(IV)

where $R^7$ is hydrogen, $C_{1-10}$ alkyl, or $C_{1-10}$haloalkyl; and x is an integer of 1 to 9.

8. The laboratory consumable of claim 7, wherein the compound of formula (IV) is 1H,1H,2H,2H-heptadecafluorodecylacrylate.

9. A method for reducing liquid sample retention by a laboratory consumable, the method comprising a preliminary step of applying a continuous power plasma to the laboratory consumable and a subsequent step of exposing the consumable to a pulsed plasma in a gaseous state for a period of time sufficient for a polymeric layer to form on both the inside and outside surfaces of the laboratory consumable thereby reducing the liquid sample retention by the consumable, the plasma comprising a compound of formula (I)

(I)

where $R^1$, $R^2$ and $R^3$ are independently selected from hydrogen, alkyl, haloalkyl or aryl optionally substituted by halogen; and $R^4$ is a group $X-R^5$ where $R^5$ is an alkyl or haloalkyl group and X is a bond; or $R^4$ is $C(O)O(CH_2)_nY$ where n is an integer of 1 to 10 and Y is a bond, an alkyl or haloalkyl group, or a sulphonamide group; or $R^4$ is $(O)_pR^6(O)_q(CH_2)_t$ where $R^6$ is aryl optionally substituted by halogen, p is 0 or 1, q is 0 or 1 and t is 0 or an integer of 1 to 10, provided that where q is 1, t is other than 0.

10. The method of claim 9, wherein the laboratory consumable is placed in a plasma deposition chamber, a glow discharge is ignited within the chamber, and a voltage is applied as a pulsed field.

11. The method of claim 10, wherein the applied voltage is at a power of 40 W to 500 W.

12. The method of claim 10, wherein the voltage is pulsed in a sequence in which the ratio of the time on to time off is about 1:500 to 1:1500.

13. The method of claim 12, wherein the voltage is pulsed in a sequence where power is on for 20 μs to 50 μs, and off for 1000 μs to 30000 μs.

14. The method of claim 10, wherein the voltage is applied as a pulsed field for a period of 30 seconds to 90 minutes.

15. The method of claim 14, wherein the voltage is applied as a pulsed field for 5 minutes to 60 minutes.

16. The method of claim 9, wherein the preliminary step is conducted in the presence of an inert gas.

17. The method of claim 10, wherein the compound of formula (I) in gaseous form is fed into the plasma at a rate of from 80 mg/minute to 300 mg/minute, while the pulsed voltage is applied.

18. The method of claim 9, wherein the plasma is created with a voltage at an average power of $0.001$ W/m$^3$ to $500$ W/m$^3$.

19. The method of claim 18, wherein the plasma is created with a voltage at an average power of $0.001$ W/m$^3$ to $100$ W/m$^3$.

20. The method of claim 18, wherein the plasma is created with a voltage at an average power of $0.005$ W/m$^3$ to $0.5$ W/m$^3$.

21. The method of claim 9, wherein the compound of formula (I) is a compound of formula (II)

$$CH_2=CH-R^5 \qquad (II)$$

where $R^5$ is an alkyl or haloalkyl group.

22. The method of claim 9, wherein the compound of formula (I) is a compound of formula (III)

$$CH_2=CR^7C(O)O(CH_2)_nR^5 \qquad (III)$$

where n is an integer of 1 to 10, $R^5$ is an alkyl or haloalkyl group, and $R^7$ is hydrogen, $C_{1-10}$ alkyl, or $C_{1-10}$haloalkyl.

23. The method of claim 22, wherein the compound of formula (III) is a compound of formula (IV)

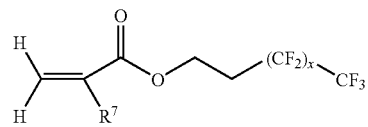

(IV)

where $R^7$ is hydrogen, $C_{1-10}$alkyl, or $C_{1-10}$haloalkyl, and x is an integer of 1 to 9.

24. The method of claim 23 wherein the compound of formula (IV) is 1H,1H,2H,2H-heptadecafluorodecyl acrylate.

* * * * *